(12) United States Patent
Niknafs et al.

(10) Patent No.: US 7,246,795 B2
(45) Date of Patent: Jul. 24, 2007

(54) CERAMIC PACKING ELEMENT

(75) Inventors: Hassan S. Niknafs, Stow, OH (US);
Richard N. Robinette, Stow, OH (US);
Stephen L. Dahar, Solon, OH (US);
Thomas Szymanski, Hudson, OH (US);
John S. Reid, Wooster, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 94 days.

(21) Appl. No.: 10/517,545

(22) PCT Filed: Jun. 9, 2003

(86) PCT No.: PCT/US03/17994

§ 371 (c)(1),
(2), (4) Date: Dec. 10, 2004

(87) PCT Pub. No.: WO03/106017

PCT Pub. Date: Dec. 24, 2003

(65) Prior Publication Data

US 2005/0212153 A1 Sep. 29, 2005

Related U.S. Application Data

(63) Continuation of application No. 10/167,893, filed on Jun. 12, 2002, now abandoned.

(51) Int. Cl.
*B01F 3/04* (2006.01)

(52) U.S. Cl. .................. 261/94; 261/DIG. 72

(58) Field of Classification Search .......... 261/94, 261/95, DIG. 72
See application file for complete search history.

(56) References Cited

U.S. PATENT DOCUMENTS

| | | | |
|---|---|---|---|
| 1,173,187 A | | 2/1916 | Hechenbleikner |
| 2,172,714 A | | 9/1939 | Schack et al. |
| 2,183,657 A | | 12/1939 | Page |
| 3,481,455 A | * | 12/1969 | Graham et al. ............. 206/523 |
| 4,002,705 A | | 1/1977 | McKeown |
| D245,999 S | * | 10/1977 | Strigle et al. .............. D25/116 |
| 4,490,312 A | * | 12/1984 | Furr ............................ 261/98 |
| 4,510,261 A | | 4/1985 | Pereira et al. |
| 4,575,435 A | * | 3/1986 | Kuhl ........................... 261/94 |
| D344,784 S | * | 3/1994 | Swingle ..................... D23/209 |
| 5,304,423 A | | 4/1994 | Niknafs et al. |
| D381,394 S | | 7/1997 | Lex et al. |
| D383,066 S | * | 9/1997 | Dudley et al. ............... D9/456 |
| 5,688,444 A | * | 11/1997 | Koshy ......................... 261/94 |
| 5,747,143 A | | 5/1998 | Niknafs et al. |
| 6,007,915 A | * | 12/1999 | Rukovena ................... 428/397 |

(Continued)

FOREIGN PATENT DOCUMENTS

BE 481212 4/1948

(Continued)

*Primary Examiner*—Scott Bushey
(74) *Attorney, Agent, or Firm*—Fay Sharpe LLP; Ann M. Skerry

(57) ABSTRACT

The invention provides an improved ceramic packing element (1, 6, 8) suited to use as a bed limiter having a generally uniform cross-section in the length (l) direction with the basic shape of a bow-tie and having a plurality of through passages (5) parallel to the length dimension (L).

13 Claims, 3 Drawing Sheets

U.S. PATENT DOCUMENTS

| | | | | |
|---|---|---|---|---|
| D465,257 S | * | 11/2002 | Van Olst et al. | D23/207 |
| 6,517,058 B1 | * | 2/2003 | Engh et al. | 261/112.1 |
| 6,889,963 B2 | * | 5/2005 | Niknafs et al. | 261/94 |

FOREIGN PATENT DOCUMENTS

| | | |
|---|---|---|
| DE | 335471 | 4/1921 |
| DE | 2425058 A1 | 12/1975 |
| GB | 255770 | 7/1926 |
| GB | 374707 | 6/1932 |

* cited by examiner

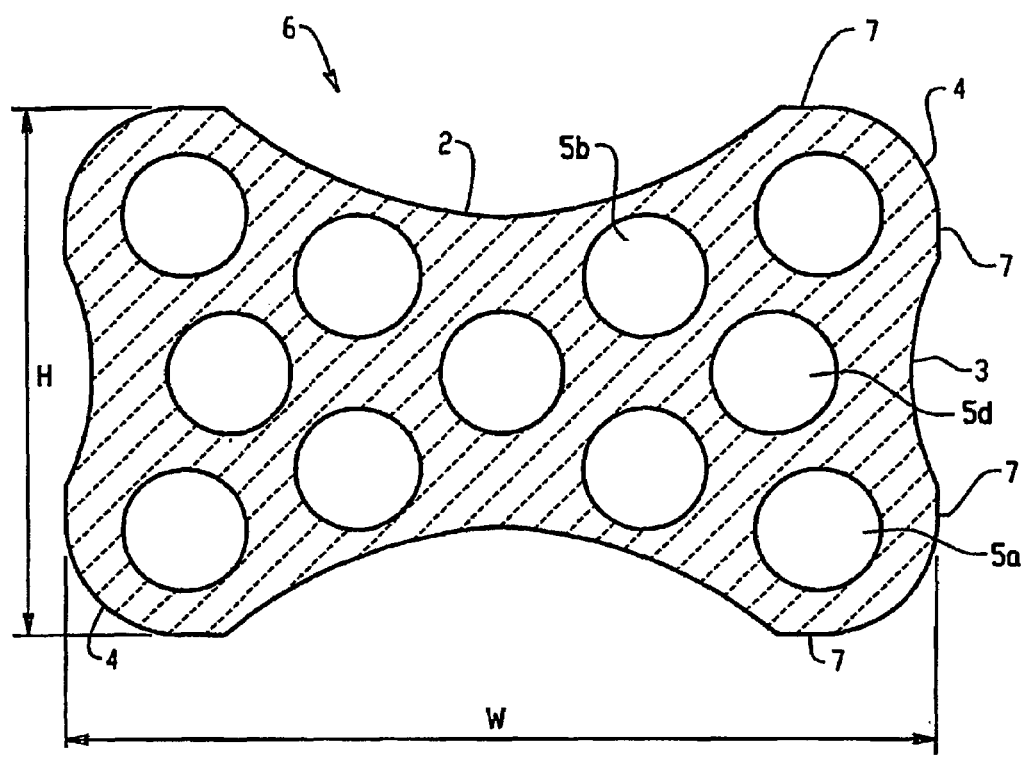
Fig. 3
  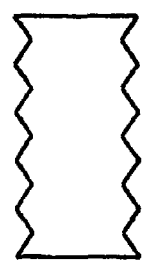    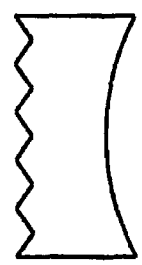
Fig. 4a    Fig. 4b    Fig. 4c    Fig. 4d

CERAMIC PACKING ELEMENT

This application is the U.S. national phase entry of PCT/US03/17994, filed Jun. 9, 2003, and claims priority as a continuation in part, of U.S. application Ser. No. 10/167,893, filed Jun. 12, 2002, now abandoned, the disclosures of which are incorporated in their entireties, by reference.

BACKGROUND OF THE INVENTION

1. Field of the Invention

The invention relates to packing elements of the type that are often called "random" or "dumped" packings, and will be described with particular reference thereto. However, it will be appreciated that the elements have applications in other areas.

2. Discussion of the Art

Random or dumped packings are used to fill towers units in which mass or heat transfer or any chemical reaction processes occur. A particularly important application is the use of such ceramic elements in heat recovery operations where it is necessary to provide maximum effective contact with hot fluids passing through the reactor. Another key factor in maximizing efficiency is the maintenance of as low a pressure difference between top and bottom of the tower as possible. To ensure this the packing elements should present the minimum resistance to flow. This is promoted by very open structures but open structure alone is of limited use if the elements in the tower nest together such that parts of one packing element penetrate within the space of a second element. It is therefore important that the design of the elements minimize the tendency of the elements to nest together. Another particularly important application is as a bed topping material which is intended to keep material within a bed confined with limited ability to be entrained in a gas flow or to be caused to move around by such a flow. Such entrainment or abrasion typically causes significant losses to the material in the bed.

Ceramic packing elements can be produced by an extrusion or a dry-pressing process and hence have an essentially uniform cross-section along one axial direction which provides an axis of symmetry for the element. Several such shapes have been described in the art ranging from the very simple to the complex. All are based on an essentially cylindrical shape and differ basically in the internal structure within the cylindrical shape. The simplest structure is a basic cylinder with no internal structure at all. This type of structure is often called a Raschig ring and has been known for many years. At the other end of the complexity scale are the structures described in U.S. Design Pat. No. 455,029 and U.S. Pat. No. 6,007,915. Between the extremes there are simple wagon-wheel shapes such as are described in U.S. Pat. Nos. 3,907,710 and 4,510,263. Others show deformed cylindrical structures, such as those described in U.S. Pat. No. 5,304,423. BE 481 212 discloses a packing element for use in heat exchangers, distillation towers, catalyst supports, and the like having four through passages and an indented exterior surface. DE 24 25 058 discloses a ceramic filling material with a cylindrical or hexagonal shape and multiple through passages. U.S. Pat. No. 2,172,714 discloses a stackable block for regenerators.

For certain applications, such as bed limiters, the pressure drop is less important since the thickness of the bed limiter layer is relatively small. It is far more important that the packing elements do not nest together and still allow free passage of gases while being heavier that the elements comprising the bed on which the packing elements rest and whose extent is thereby limited.

SUMMARY OF THE INVENTION

In accordance with one aspect of the present invention, a ceramic packing element is provided. The element has an essentially uniform cross-section along an axis passing through a center of the element and about which the element is symmetrical defining a length of the element. A ratio of a width to the length is from 1.5:1 to 5:1. First and second concave external surfaces are provided at the ends of height and width axes respectively, perpendicular to the length direction. The concave surfaces are connected by surfaces that are selected from (i) convex surfaces and (ii) convex surfaces connected to the concave surfaces by relatively short intermediate flat surfaces. The element is provided with at least three through passages in the length direction. At least one of the passageways is kidney bean-shaped in cross-section. The kidney-bean shaped passageway has two generally parallel arcuate surfaces.

In accordance with another aspect of the invention, a method of forming a bed of packing elements is provided. The method includes extruding a mixture comprising one or more ceramic-forming components, sectioning the extruded mixture to form sections, firing the sections to form packing elements. Each of the packing elements has first and second concave external surfaces at the ends of height and width axes respectively perpendicular to a length direction. The concave surfaces are connected by surfaces that are selected from convex surfaces and convex surfaces connected to the concave surfaces by relatively short intermediate flat surfaces. The element is provided with at least three through passages in the length direction. At least one of the passageways is kidney bean-shaped in cross-section. The kidney-bean shaped passageway has two generally parallel arcuate surfaces. The method further includes assembling a bed of packing elements including a plurality of the fired packing elements.

In accordance with yet another aspect of the present invention, a ceramic packing element is provided. The element has first and second opposed generally planar surfaces. First and second concave external surfaces are provided at the ends of height and width axes, respectively, of the planar surfaces. The concave surfaces are connected by surfaces that are selected from (i) convex surfaces and (ii) convex surfaces connected to the concave surfaces by relatively short intermediate flat surfaces. The element is provided with a plurality of through passages in a length direction, at least one of the through passages having a cross section defined by a first arcuate surface and a second arcuate surface, the second arcuate surface being longer than the first arcuate surface and located generally parallel thereto.

The advantages of the present invention will be readily apparent to those skilled in the art, upon a reading of the following disclosure and a review of the accompanying drawings.

BRIEF DESCRIPTION OF THE DRAWINGS

FIG. 3 is a cross-section of a second embodiment of a bed limiter packing element of the invention similar to that shown in FIG. 1 except for the provision of flat exterior portions connecting the convex and concave portions;

FIG. 4 (a to d) shows four different side views illustrating possible end configurations of the element;

DETAILED DESCRIPTION OF THE PREFERRED EMBODIMENT

A solid ceramic packing element is provided having an essentially uniform cross-section along an axis of symmetry in the direction of extrusion defining the length of the element. The element has first and second concave external surfaces at the ends of height and width axes respectively perpendicular to the length direction. The concave surfaces are connected by convex surfaces. The element is provided with a plurality of through passages in the length direction.

The invention is now more particularly described with reference to the embodiment illustrated in FIG. 1. This is not intended to imply any necessary limitations in the scope of the invention because it will be readily appreciated that many minor variations could be made without departing from the essential spirit of the invention.

Figure 1:
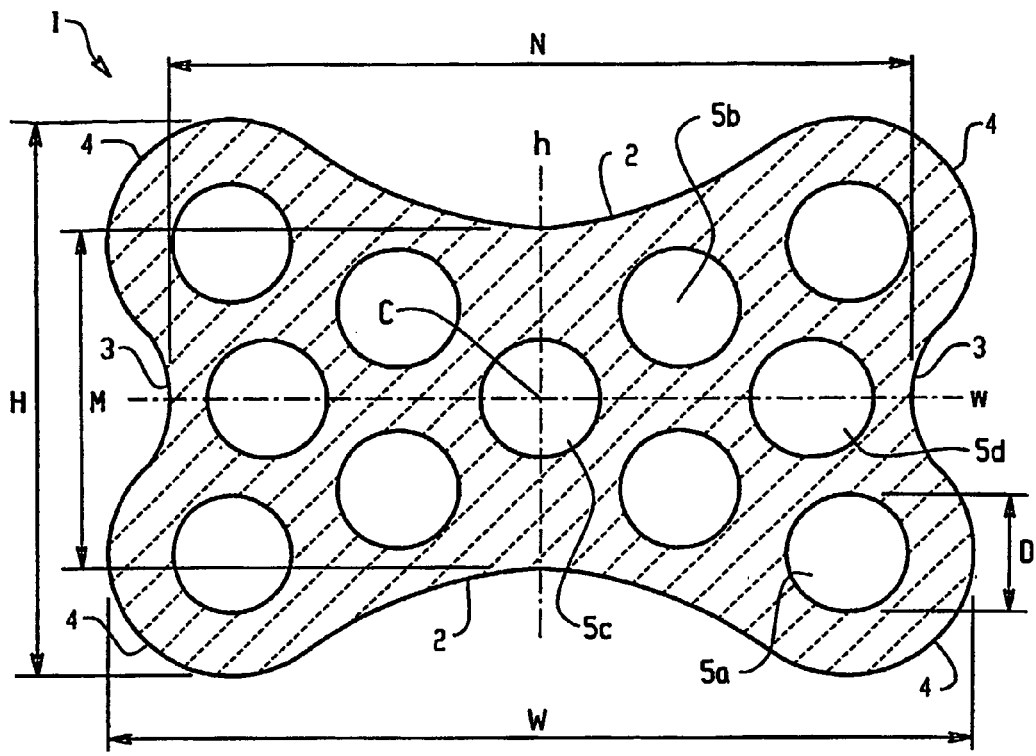
FIG. 1 is a cross-section of a bed limiter packing element of the invention.

In FIG. 1 a bed limiter packing element 1 is shown in cross-section along the length dimension. The element has a width dimension W, parallel to the width axis w, and a height dimension H, parallel to the height axis h, the width W being greater than or equal to the height H. At either end of the height dimension are first concave surfaces 2 and at either end of the width dimension are second concave surfaces 3. These first and second concave surfaces 2, 3 are connected by convex surfaces 4.

The provision of an essentially uniform cross-section along the direction defining the length L of the element (FIG. 2) does not preclude the provision of ends to the element that are not perpendicular to the length direction. Indeed it is sometimes preferred that the ends be cut at an angle to the length direction since this is found to reduce the incidence of "nesting" or alignment of the elements in a manner that increases the pressure drop across a reactor containing the elements. The ends can also be cut to have concave, convex, or dentate appearances in cross-section.

The element of any of the embodiments described herein is conveniently extruded from a ceramic material and this is understood to embrace ceramic materials such as for example those based on aluminosilicate clays, alumina, zirconia, cordierite, titania, alone or in admixture with one another or other ceramic-forming components.

Alternatively, the element can be formed by a pressing or molding process in which case relatively small intermediate flat surfaces may be included on the exterior surfaces at the junction between the concave and convex surfaces to facilitate easy handling of the product during forming. The intermediate flat surfaces are short relative to the concave and convex surfaces and are intended merely to facilitate handling in a production process in which the elements are molded rather than extruded.

In one embodiment of the invention, the width and height dimensions W, H of the element are unequal with the ratio of width W to height H being from 1.25:1 to 3:1 and, in one embodiment, from about 1.3:1 to 2.0:1. Thus, in visual terms, the cross-section perpendicular to the length of the preferred elements of the invention resembles the classic "dog-bone" or "bow tie" shape. In one embodiment, the W:H ratio is about 1.5:1.

The length dimension L (FIG. 2) is preferably less than the width W, with the width to length ratio W:L being, in one embodiment, from 1.5:1 to 20:1 and in another embodiment, from 1.5:1 to 4:1. In one embodiment, H:L is about 8:1.

There are at least three passages 5 through the element and the number can be from 4 to 275 and, in one embodiment, from 7 to 20. In the embodiment of FIG. 1, the passages through the element are generally uniformly spaced, i.e., the distance between any two adjacent passages is generally no more than 50% more than or less than the mean distance between two adjacent passages. The passages 5 can have any desired cross-section, such as round, oval, oblate, kidney bean shaped, regular or irregular polygon, or the like. Combinations of two or more passage shapes within an element are also contemplated. In the embodiment of FIG. 1, the passages 5 all have round cross-sections.

The passages tend to reduce the pressure drop across a bed comprising the elements. Accordingly, in one embodiment, the passages are of sufficient number and cross sectional area to reduce the pressure drop by at least 50%, as compared with an equivalent packing bed comprising element without passages.

Clearly, the larger the number of passages 5, the smaller the cross-sectional area of a single passage 5 generally must be. In one embodiment, the maximum cross-sectional dimension D of each of the passages 5 does not exceed two thirds of dimension H of the element. In one specific embodiment, D does not exceed one half the dimension H of the element and, in another embodiment, is not greater than one third of this dimension. In one embodiment, illustrated in FIGS. 1 and 3, the passages are identical in dimensions and are round. In one embodiment, a ratio of D:H is at least 1:10, and can be at least 1.5:10.

In the cross-section of the packing element, the area represented by the total cross section of the passages can be at least about 20% of the total cross-sectional area of the element and can be up to about 75% of the total cross-sectional area. In one specific embodiment, the cross sectional area of the passages is at least 30% of the total cross-sectional area, in another specific embodiment, at least 40%, and in another specific embodiment, the cross sectional area of the passages is up to 67% of the total cross-sectional area of the element.

The concave surfaces 2, 3 provide reduced width regions of the element, which are narrowest at the midpoint of the concave surfaces. The width and height of the element at the narrowest point, which in the illustrated embodiment, coincides with the width and height axes w, h, respectively, is termed the center width N and center height M, respectively. In one embodiment, the ratio of M:H is about 0.4 to 0.85. In a specific embodiment M:H is from 0.5 to 0.8. In one embodiment, the ratio of N:W is about 0.6 to about 0.98. In a specific embodiment N:W is from 0.7 to 0.95.

In one embodiment, the radius of curvature of the concave surfaces 3 is the same or substantially the same (i.e., within ±10%) as that of the convex surfaces 4. In one embodiment, the radius of curvature of the concave surfaces 2, is less than or equal to W. In one embodiment, the radius of curvature of the concave surfaces 3, is less than or equal to H.

Figure 2:
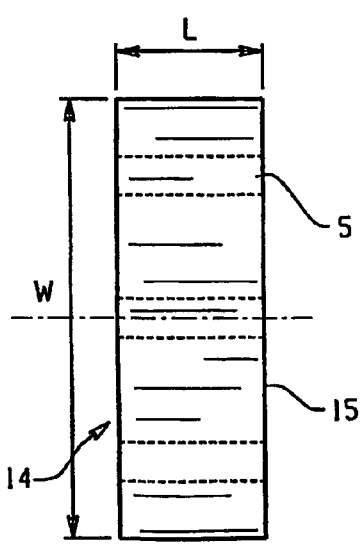
FIG. 2 is a side view of the packing element of FIG. 1.

With continued reference to FIG. 1, the element has a uniform cross-section along its length, as illustrated in FIG. 2. The concave surfaces 2, 3 can be regarded as channels in the outside surface of the element running the length of the element. A plurality of passages 5 run through the element parallel to the length dimension. The passages are preferably uniform in cross-section along the length and in the illustrated element of FIGS. 1 and 2, have the same diameter, which represents about one third of the height dimension H.

In one embodiment, the element is symmetrical about h and w axes. Each of four quadrants of the packing element includes at least one generally circular corner passage 5a which is generally centrally positioned in the area surrounded by the convex surface 4, such that the convex surface defines an arc having a midpoint within the corner passage 5a, which midpoint, in one embodiment, is coincident with a midpoint of the passage 5a.

In addition to the four corner passages 5a, each quadrant defines at least one additional intermediate passage 5b or portion thereof, located intermediate the corner passage 5a and the center C of the element, represented by the intersection of h and w axes. A central round passage 5c is located with its midpoint at the center C of the element. Additional passages 5d intersect the w axis.

In the embodiment of FIG. 3, a ceramic packing element 6 has small flat exterior surfaces 7 which connect the concave and convex sections. The shape is however otherwise the same.

In FIG. 4, four optional ways of forming the ends of the elements are shown. In FIGS. 4a to 4d the drawing shows, (for left and right ends respectively in each case), concave and straight-cut ends; two dentate-cut ends; two concave ends; and dentate and concave ends.

Figure 5:
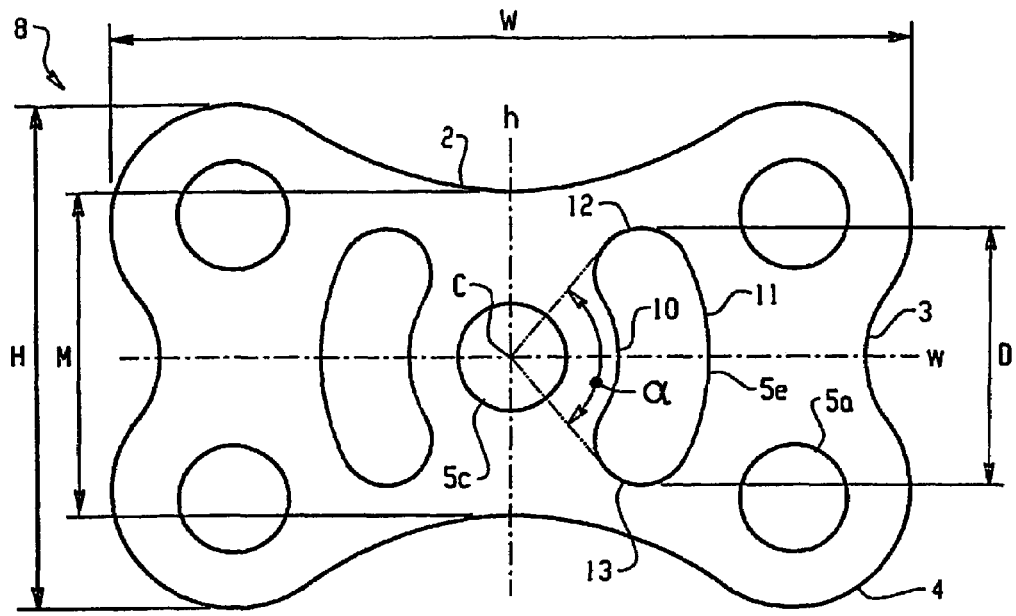
FIG. 5 is a top plan view of a third embodiment of a bed limiter packing element of the invention.
Figure 6:
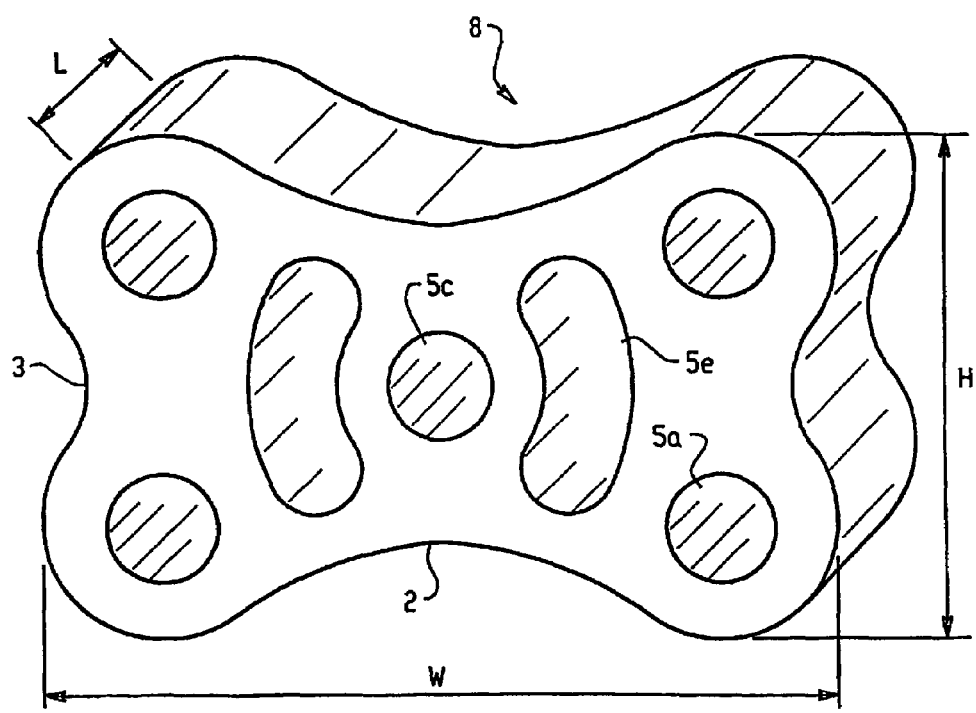
FIG. 6 is a perspective view of the embodiment of FIG. 5.

In the embodiment of FIGS. 5 and 6, an element 8 having a peripheral shape similar to that of FIG. 1 is shown, although a peripheral shape with flat exterior surfaces 7, similar to that of FIG. 3 is also contemplated.

As with the element of FIG. 1, the element is symmetrical about h and w axes. A central round passage 5c is located at the center C of the element. Four corner passages 5a are positioned as described for FIG. 1. Instead of the two intermediate passages 5b, intermediate the corner passages 5a and the central passage 5c is a kidney bean-shaped passage 5e, which extends across the w axis and thus portions of the passage 5e are located in adjacent quadrants. A second kidney bean-shaped passage 5e, which is a mirror image of the first in shape and location, is defined by the other two quadrants. The kidney bean-shaped passage 5e includes inner and outer arcuate surfaces 10, 11, respectively. The inner surface 10 is shorter in length than the outer surface 11 and is parallel or generally parallel thereto. In the illustrated embodiment, the arcuate surfaces 10, 11 each define an arc of a respective imaginary circle having a midpoint which is at or adjacent to the center C of the element, although the midpoint of the imaginary circles can be closer to or further from the passage 5e than the center C of the element. The arcuate surfaces 10, 11 are connected at ends thereof by convex surfaces 12, 13, although it is also contemplated that surfaces 12, 13 may be straight or slightly concave. The arcuate surfaces 10, 11 and convex surfaces 12, 13 extending therefrom together subtend an angle α which is less than 120°, more preferably, about 90°. The kidney bean-shaped passage 5e can have a largest dimension D which is up to about ⅔ of the height H of the element. In one embodiment, D is less than or equal to M.

The kidney bean-shaped passage 5e provides for a structurally strong element while optimizing the flow through the element. Theoretical calculations show that the pressure drop of a gas flow across a packing bed formed with elements of the type illustrated in FIG. 5 is significantly less than experienced with spherical elements, and in one embodiment, is less than about 50% of the pressure drop with spherical beads.

The ratio of the total area of the passages to the area of the element can be the same as that described for FIGS. 1 and 2. In one specific embodiment, the passages 5, in total, occupy 35-50% of the cross sectional area of the element 8. The ratio of W:L and H:L can be the same as that for the embodiment of FIG. 1. In one embodiment, H:L is from about 5:1 to 15:1 and in another embodiment, about 8:1.

The element 8 has a uniform cross section in the length dimension, as shown in FIG. 2, i.e., it has a first planar surface 14 which is parallel to an opposed second planar surface 15, although it is also contemplated that a structure as shown in FIGS. 4a-4d may be employed.

In addition to use the use as a bed limiter or as a regular packing element providing mass and/or heat transfer surfaces, it is possible to provided that the element has a porous construction making it suitable for use also as carrier for a catalyst deposited within the pores of the element as well as within the through passages of the element. It is possible therefore to provide for a catalyst bed comprising conventional porous catalyst-on-carrier components and limit that bed with elements according to the invention that not only provide the bed-limiting function but also serve to react with any remaining reactants that were not converted during passage through the portion of the bed containing the catalyst-bearing components.

It is foreseeable that elements with the design features described above and having bed-limiting functions could be provided by elements made from plastic materials rather than ceramics.

What is claimed is:

1. A ceramic packing element comprising an essentially uniform cross-section along an axis passing through a center of the element and about which the element is symmetrical defining a length of the element a ratio of a width dimension to the length being from 1.5:1 to 5:1, and first and second concave external surfaces at the ends of height and width axes respectively perpendicular to the length direction, said concave surfaces being connected by surfaces that are selected from convex surfaces and convex surfaces connected to the concave surfaces by relatively short intermediate flat surfaces, and the element being provided with at least three through passages in the length direction, at least one of the passageways being kidney bean-shaped in cross-section, the kidney-bean shaped passageway having two generally parallel arcuate surfaces, wherein said element further comprises a plurality of second passages having a second shape, the at least one kidney bean-shaped passage being positioned intermediate at least one of the plurality of second of passages and the center of the element.

2. An element according to claim 1 in which the concave surfaces are connected directly to convex surfaces.

3. An element according to claim 1 or 2 in which width and height dimensions of the element are unequal with the ratio of width to height being from 1.25:1 to 3:1.

4. An element according to claim 3 in which width and height dimensions of the element are in a ratio of from about 1.3:1 to 2.0:1.

5. An element according to claim 1 in which the element is provided with from 3 to 275 passageways.

6. An element according to claim 1 in which at least a plurality of the passageways are round in cross-section and a diameter of each round passage is less than about one half of the height of the element.

7. An element according to claim 6 in which the plurality of passageways have identical dimensions.

8. An element according to claim 1 in which the at least one kidney bean-shaped passageway has a largest dimension which is up to about 2/3 of the height of the element.

9. An element according to claim 1 in which a total cross-sectional area of the passages represents from 20 to 75% of the total cross-sectional area of the element.

10. An element according to claim 9 in which a total cross-sectional area of the passages represents from 30 to 67% of the total cross-sectional area of the element.

11. An element according to claim 1 in which the ceramic is a porous material.

12. An element according to claim 1 in which a ratio of height to length of the element, H:L is from about 5:1 to 15:1.

13. An element according to claim 12 in which H:L is about 8:1.

* * * * *